Feb. 2, 1937. J. L. CONLON 2,069,219
BUMPER FOR A WINDOW GLASS
Filed April 15, 1936

INVENTOR.
James L. Conlon
BY Barnes, Kisselle, Laughlin & Raisch
ATTORNEY.

Patented Feb. 2, 1937

2,069,219

UNITED STATES PATENT OFFICE 2,069,219

BUMPER FOR A WINDOW GLASS

James L. Conlon, Detroit, Mich., assignor to General Motors Corporation, Detroit, Mich., a corporation of Delaware Application April 15, 1936, Serial No. 74,455

7 Claims. (Cl. 296—44)

This invention relates to a window well bumper for a sliding glass.

It is old in the automotive vehicle body art to provide rubber bumpers inside and adjacent the mouth of the window well which guide and also serve as anti-rattlers, and prevent the sliding window glass as it slides into and out of the window well or in any of its partially raised positions from striking against the window well and more particularly against the outside reveal or the inside garnish molding. As the window is raised or lowered the sliding friction which occurs at times between the window glass and the bumper may dislodge it unless the bumper is well secured to its support. It is an object of this invention to provide a bumper for the window glass which is very easily and also securely fastened to its support so that it will not be dislodged by frictional engagement with the window glass.

It is old in the art to mount a rubber bumper in the window well by providing the support with a square or circular opening of uniform width and length and to provide the bumper with a stem and button portion which is slightly larger than the opening in the support. The button portion is compressed and crowded through the opening whereupon it is permitted to expand and overlap the support on the inside of the opening. This arrangement has proved unsatisfactory because the button portion of the bumper is necessarily limited to a size that can be readily compressed and passed through the circular or rectangular opening of uniform width and length. The buttons have been limited necessarily to a size insufficient to provide the necessary overlap with the opening in the support to securely interlock the bumper with its support. It is an object of this invention to produce a bumper that can be securely interlocked with its support to a degree not possible with this old type bumper and so that sliding friction with the window glass will not dislodge it.

Figure 1:
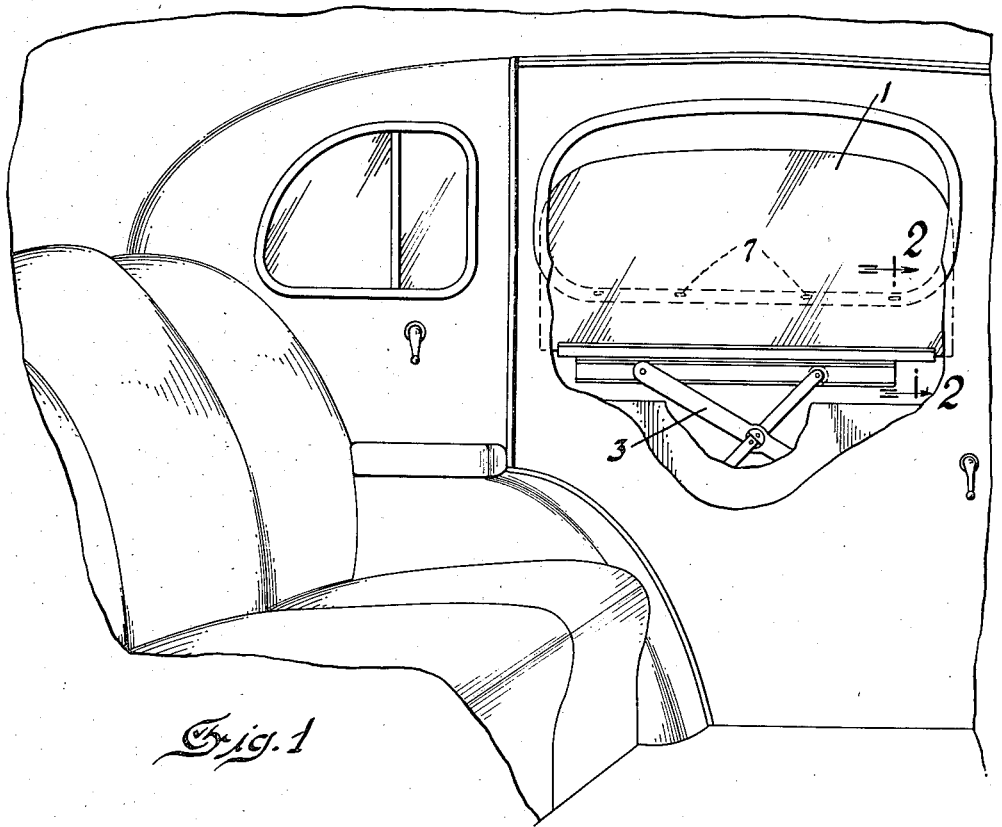
Fig. 1 is an inside view of an automobile body showing the location of the bumpers inside and adjacent the mouth of the window well.
Figures 2, 3:
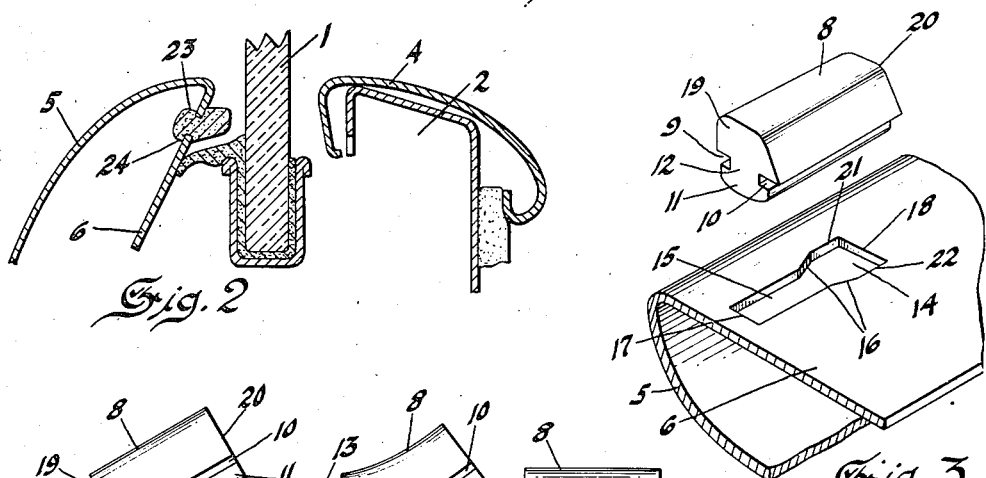
Fig. 2 is a section along the line 2—2 of Fig. 1 but with the window glass lowered partially.
Fig. 3 is an enlarged detail view of the bumper and the opening with which it is interengaged to fasten the same in the window well.

Referring more particularly to the drawing there is shown an automobile body having a window glass 1 which is arranged to be lowered into, and raised from, the window well 2 by means of a window regulator 3. The mouth of the window well is defined on the inside by the garnish molding 4 and on the outside by the reveal 5 having the depending flange 6 which serves as a support for one or more of the bumpers 7.

The bumper 7 may be made of any suitable material which is flexible and preferably resilient, such as rubber. The rubber bumper 7 comprises a body portion 8 having grooves 9 and 10 in its side walls which preferably extend the length of the bumper. The bumper 7 is thus generally divided into a body portion 8, an interlocking portion 11 and a neck portion 12 between the body portion 8 and the interlock portion 11.

Any suitable support for the bumper 7 may be provided within the window well. Preferably the flat depending flange 6 of the reveal window panel is used for this purpose. To this end the depending flange 6 is provided with an opening 13 having an enlarged mouth 14 and a narrow portion 15. The sides of the mouth portion 14, adjacent the narrow portion 15, converge as at 16 so that the mouth 14 gradually merges into the narrow portion 15. The over-all length from one end 17 to the other end 18 of the opening 13 is preferably approximately equal to the over-all length of the bumper 7 from one end 19 to the other end 20, but in any event the bumper should be longer than the mouth of the opening 13 to insure continuous interlocking of the narrow portion 15 with the grooves of the bumper. The width of the mouth 14 from one side wall 21 to the other side wall 22 should preferably not be less than the width of the interlock portion 11 and preferably is approximately the same width or slightly larger. The essential point is that the mouth 14 should be wide enough to permit the interlock portion to be passed through with little or no compressing of the rubber and that the width of the narrow portion 15 of the opening 13 should be less than the width of the interlocking portion 11 and preferably about the same width as the neck portion 12 of the bumper 7 so that the interlocking portion 11 will overlap the flange 6 on each side of the narrow portion 15 of the opening as at 23 and 24.

Figures 4, 5, 6:
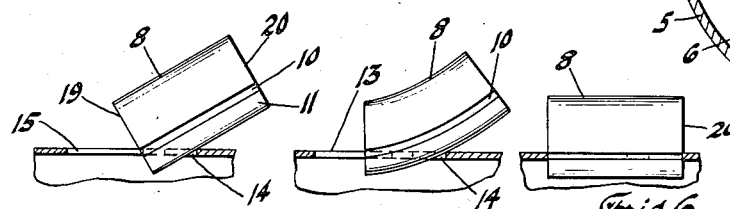
Figs. 4, 5 and 6 are progressive views illustrating the securing of the bumper with its support in the window well.

The method pursued in securing the bumper 7 to its support is shown in Figs. 4, 5, and 6. The bumper is tilted and one end inserted through the mouth 14 of the opening 13 so that the inclined faces 16 of the opening engage the grooves 9 and 10. The bumper being flexible can then be bent as shown in Fig. 5 which permits it to be slid forwardly or to the left whereupon the side edges of the narrow portion 15 of the opening slidably engage the bumper in the grooves 9 and 10. The bumper 7 is pushed forwardly until the front end 19 of the bumper, particularly the front end of the neck portion 12, abuts the front end 17 of the opening 13. At this time the rear end 20 of the bumper is approximately above the rear end 18 of the opening. Now by pressing the rear end of the bumper inwardly toward the flange 6 and also pressing it slightly forwardly, the rear end of the bumper can be crowded into the mouth of the opening 14. This completes the insertion of the bumper into the opening 13 as shown in Fig. 6. At this time the edges or shoulders of the interlocking portion 11 engage the inside face of the flange 6 on each side of the narrow portion 15 of the opening as at 23 and 24 and thus effectively interengage the bumper with its support 6. At the same time the abutment of the faces 19 and 20 with the front and rear edges 17 and 18 of the opening 13 prevent longitudinal displacement of the bumper and cooperate with the interlocking portions 11 to retain the bumper in the opening 13. It is thus evident that the width of the mouth 14 of the opening 13 can be increased relative to the width of the narrow portion 14 any amount desired to thus increase the width and amount that the interlock portion 11 of the bumper will overlap the flange 6 on each side of the narrow portion 15 of the opening and thus effect a very secure interlock between the bumper and its support. Since it is proposed to make the mouth 14 of the opening 13 wider than the portion 15 and since the interlock portion 11 does not need to be compressed and crowded through portion 15 of the opening 13, the size of the interlock portion is controlled solely by the size of mouth 14 and not by the size of the portion 15 of the opening with which it overlaps to lock the bumper to the support 6.

I claim:

1. In a vehicle body having a window panel arranged for retreat into, and withdrawal from, a window well, a support in the window well, an opening in the said support having a mouth portion wider than the remaining portion of the opening, a bumper having a head portion and an interlock portion, the said interlock portion being adapted to be passed through the mouth of the said opening and being wider than the remaining portion of the said opening whereby the said interlock portion of the bumper can be passed through the mouth of the opening and the bumper slid along the opening to interengage the interlock portion of the bumper with the said support in the remaining portion of the opening.

2. In a vehicle body having a window panel arranged for retreat into, and withdrawal from, a window well, a support in the window well, an opening in the said support having a mouth portion wider than the remaining portion of the opening, a bumper having head and interlock portions both wider than the remaining portion of the opening and a neck portion extending between the head and interlock portions and through the remaining portion of the opening and narrower than the said head and interlock portions, the said interlock portion being adapted to be passed through the mouth of the said opening whereby the said interlock portion of the bumper can be passed through the mouth of the opening and the bumper slid along the opening to position the head and interlock portions on opposite sides of, and the neck portion in, the remaining portion of the said opening whereby the bumper is interengaged with its said support.

3. In a vehicle body having a window panel arranged for retreat into, and withdrawal from, a window well, a flexible bumper having grooves extending lengthwise of its side walls, a flat support positioned in the window well, an opening in the flat portion of the said support having a mouth portion and a portion of less width than the mouth portion whereby the said bumper can be passed through the mouth of the opening and slid along the narrow portion of the opening so that the narrow portion of the opening interengages the bumper in the said grooves to secure the bumper to the said support.

4. In a vehicle body having a window panel arranged for retreat into, and withdrawal from, a window well, a flexible bumper having grooves extending lengthwise of its side walls, a flat support positioned in the window well, an opening in the flat portion of the said support having a mouth portion and a portion of less width than the mouth portion whereby the said bumper can be passed endwise through the mouth of the opening and slid along the narrow portion of the opening so that the narrow portion of the opening interengages the bumper in the said grooves to secure the bumper to the said support, the over-all length of the said bumper being greater than that of the mouth of the said opening whereby the ends of the opening hold the bumper in interlocking engagement with the narrow portion of the opening.

5. In a vehicle body having a window panel arranged for retreat into, and withdrawal from, a window well, a flexible bumper having grooves extending lengthwise of its side walls, a flat support positioned in the window well, an opening in the flat portion of the said support having a mouth portion and a portion of less width than the mouth portion whereby the said bumper can be passed endwise through the mouth of the opening and slid along the narrow portion of the opening so that the narrow portion of the opening interengages the bumper in the said grooves to secure the bumper to the said support, the over-all length of the said bumper being approximately equal to that of the opening whereby the ends of the bumper abut the ends of the opening to hold the bumper in interlocking engagement with the narrow portion of the opening.

6. In a vehicle body having a window panel arranged for retreat into, and withdrawal from, a window well, a flexible bumper having an interlock portion, a flat support positioned in the window well, an opening in the flat portion of the said support having a mouth portion and a portion of less width than the mouth portion whereby the said bumper can be passed endwise through the mouth of the opening and slid along the narrow portion of the opening so that the narrow portion of the opening interengages the bumper in the said grooves to secure the bumper to the said support, the over-all length of the said bumper being greater than that of the mouth of the said opening whereby the ends of the opening hold the bumper in interlocking engagement with the narrow portion of the opening, the width of the narrow portion of the opening being less than the width of the interlock portion of the bumper whereby the interlock portion overlaps the support on each side of the narrow portion of the opening.

7. In a vehicle body having a window panel arranged for retreat into, and withdrawal from, a window well, a flexible bumper having an interlock portion, a flat support positioned in the window well, an opening in the flat portion of the said support having a mouth portion and a portion of less width than the mouth portion whereby the said bumper can be passed endwise through the mouth of the opening and slid along the narrow portion of the opening so that the narrow portion of the opening interengages the bumper in the said grooves to secure the bumper to the said support, the over-all length of the said bumper being greater than that of the mouth of the said opening whereby the ends of the opening hold the bumper in interlocking engagement with the narrow portion of the opening, the interlock portion being of such size that it can be easily passed through the mouth of the opening and of greater width than the narrow portion of the opening whereby the interlock portion of the bumper overlaps the support on each side of the narrow portion of the opening.

JAMES L. CONLON.